(12) United States Patent
Alvarez et al.

(10) Patent No.: US 8,598,308 B2
(45) Date of Patent: Dec. 3, 2013

(54) MULTIFUNCTIONAL DENDRONS AND DENDRIMERS WITH A HIGH LOADING CAPACITY

(75) Inventors: Mario Moises Alvarez, Monterrey (MX); Jesus Angel Valencia Gallegos, Guadalupe (MX)

(73) Assignee: Instituto Tecnológico y de Estudios Superiores de Monterrey, Monterrey (MX)

( * ) Notice: Subject to any disclaimer, the term of this patent is extended or adjusted under 35 U.S.C. 154(b) by 514 days.

(21) Appl. No.: 12/739,717

(22) PCT Filed: Oct. 24, 2008

(86) PCT No.: PCT/MX2008/000143
§ 371 (c)(1),
(2), (4) Date: Aug. 9, 2010

(87) PCT Pub. No.: WO2009/054712
PCT Pub. Date: Apr. 30, 2009

(65) Prior Publication Data
US 2010/0298577 A1     Nov. 25, 2010

(30) Foreign Application Priority Data
Oct. 24, 2007   (MX) .................... MX/a/2007/013267

(51) Int. Cl.
*C08G 59/00* (2006.01)
*C07C 229/00* (2006.01)
(52) U.S. Cl.
USPC .............................. 528/403; 560/43; 977/754

(58) Field of Classification Search
USPC ............................................ 528/403; 560/43
See application file for complete search history.

(56) References Cited

U.S. PATENT DOCUMENTS

| 6,114,458 A * | 9/2000 | Hawker et al. ................. 525/242 |
| 6,515,192 B1 | 2/2003 | Rink et al. |
| 2002/0123609 A1* | 9/2002 | Frechet et al. ................. 528/403 |
| 2007/0190151 A1 | 8/2007 | Chai et al. |
| 2007/0213501 A1 | 9/2007 | Bruchmann et al. |

FOREIGN PATENT DOCUMENTS

| WO | WO/02/26867 | 4/2002 |
| WO | WO/2004/072153 | 8/2004 |

OTHER PUBLICATIONS

PCT Search Report, Feb. 23, 2009.
Valencia-Gallegos et al, Novel Superloaded dendrimers for drug delivery, the Trojan approach, Fourth Int'l Nanomedicine and drug Delivery Sumposium, Embassy Suites, Omaha Nebraska (2006).

* cited by examiner

*Primary Examiner* — Jezia Riley
(74) *Attorney, Agent, or Firm* — Baker & McKenzie LLP

(57) ABSTRACT

The invention relates to novel multifunctional dendrimer structures with a high loading capacity. Said dendrimer structures include a nucleus having at least a first generation or an end generation covalently bonded thereto. The first generation is formed by at least two of the following structures, namely: a spacer, a load, a branching element. In addition, a plurality of sequences (known as intermediary generations) with at least two of the aforementioned structures can be joined to the first generation. The terminal generation is formed by at least three of the following structures, namely: a spacer, a load, a branching element and a terminal.

9 Claims, 9 Drawing Sheets

MULTIFUNCTIONAL DENDRONS AND DENDRIMERS WITH A HIGH LOADING CAPACITY

CROSS-REFERENCE TO RELATED APPLICATIONS

This application is a 35 U.S.C. Section 371 of PCT/MX2008/000143, filed Oct. 24, 2008, which claims priority to Mexico Application No. MX/a/2007/013267 filed Oct. 24, 2007, which are incorporated herein by reference in their entirety.

OBJECT OF THE INVENTION

The object of this invention is multifunctional dendrimer structures such as dendrimers and dendrons with high loading capacity.

BACKGROUND OF THE INVENTION

Dendrimers are globular macromolecules of monodisperse distribution and size, in which all links emerge radially from a focal point or nucleus with a regular branching pattern and with repetitive units that contribute to one point of the branch. Each layer between the branching points is called generation and they are listed from the center out towards the periphery of the dendrimer.

It is important to first establish the nucleus, the number of generations, and the repetitive units used in each generation, to determine the size, the form, and the functional groups present.

In practice, Dendrimers are formed by repetitive units of the $AB_x$ type, where A and B are different functional groups and x is the amount of the B groups, a feature called multiplicity, which results in a uniform structure between the generations thereof, and have the sole purpose of increasing the amount of terminal functional groups in a regular manner and of geometric growth in amount and dependent upon their multiplicity as show in "Dendritic molecules: concepts, synthesis, perspectives." of G. R. Newkome, C. N. Moorefield, F Vögtle; Weinheim, N.Y., VCH, 1996.

Dendrimers are generally obtained via synthesis with iterative stages using divergent synthesis, in which growth of the dendrimer begins from the nucleus out to the periphery (Tomalia et al., U.S. Pat. Nos. 4,435,548; 4,507,466; 4,558,120; 4,568,737; 5,338,532), or the strategy of the convergent growth, in which the synthesis of the final structure begins in the periphery via the construction of the different branches of the dendrimer, called dendrons, and as the last step the addition of these dendrons to the nucleus (Hawker et al., U.S. Pat. No. 5,041,515).

The increase in the number of terminal groups in a dendrimer is consistent with the equation $$Z = N_C N_b^G$$

Where:
Z represents the number of terminal functional groups of the dendrimer.
$N_c$ represents the multiplicity of the nucleus (For example, $N_c=3$ for the ammonia and $N_c=4$ for Ethylene Diamine (EDA).
$N_b$ represents the multiplicity of branching.
G represents the number of the generation of the dendrimer.
For different multiplicities of the branching element, the total number of terminal functional groups is given by the equation:

$$Z = N_c \prod_{i=1}^{n} N_{bi}$$

where $N_{bi}$ is the multiplicity of the branching element i.

Tomalia in *Aldrichimica Acta*, Volume 37 Number 2, pages 39-57, 2004, illustrates the mathematical relationship for calculating the number of terminal groups on the surface of the last generation, the number of covalent bonds formed up to the G generation, called "number of branching cells", BC, and molecular weight PM, for a dendrimer with a multiplicity nucleus $N_c$, and a branching unit $N_b$.

$$BC = N_c \left[ \frac{N_b^G - 1}{N_b - 1} \right]$$

$$PM = M_c + N_c \left[ M_{RU} \left( \frac{N_b^G - 1}{N_b - 1} \right) + M N_b^G \right]$$

$M_c$ Represents the molecular weight of the nucleus
$M_{RU}$ Represents the Branching Unit
M Represents the Surface Terminal Group
Additionally, the amount of covalent bonds in generation G, indicated by $C_G$, is given in the equation:

$$C_G = N_c N_b^{G-1}; G \geq 1$$

In Table 1, there are examples of the numbers of the terminal groups of generation 0 to 10, for two dendrimers with different nucleus multiplicity.

TABLE 1

Comparison of the number of functional groups for a nucleus with multiplicities of 3 and 4.

| Generation | Trifunctional nucleus $N_c = 3$ Number of terminal groups for $N_b = 2$ | Tetrafunctional nucleus $N_c = 4$ Number of terminal groups for $N_b = 2$ |
|---|---|---|
| 0 | 3 | 4 |
| 1 | 6 | 8 |
| 2 | 12 | 16 |
| 3 | 24 | 32 |
| 4 | 48 | 64 |
| 5 | 96 | 128 |
| 6 | 192 | 256 |
| 7 | 384 | 512 |
| 8 | 768 | 1024 |
| 9 | 1536 | 2048 |
| 10 | 3072 | 4096 |

The plurality of functional groups on the periphery of a dendrimer, is one of the most important characteristics, and the reason for which they are employed in various fields of application, such as medical diagnosis, reported in *Chemical & Engineering News*, Jun. 13, 2005, pages 30-36; Wiener et al., *Magnetic Resonance. in Medicine I*, 1994, 31, pages 1-8; Adam et al., *Magnetic Resonance in Medicine*, 1994, 32, pages 622-628; vectors for DNA reported by Dufes et al., *Advanced Drug Delivery*, 2005, 57, pages 2177-2202; Bielinska et al., *Bioconjugate Chemistry;* 10 (5); pages 843-850, 1999; Kim et al., *Biomacromolecules*; volume 5 (6); pages 2487-2492, 2004 and controlled release of drugs such as reported by Ihre et al., *Bioconjugate Chemistry*, volume 13, pages 443-452, 2002; Jevprasesphant et al., *Journal of Pharmacy and Pharmacology*, 2005, volume 56; Patri et al., *Bio-* conjugate Chemistry; volume 15 (6); pages 1174-1181, 2004; Ambade et al., Mollecular Pharmaceutics, volume 2 (4), pages 264-272, 2005. However, reports on using the great number of branching points and covalent bonds formed by arriving at a certain dendrimer generation have not been found.

Frechet et al., report internal modification of a dendrimer via the use of different structural elements to make fine adjustments to the microenvironment of the dendrimer, *Journal of Organic Chemistry*; volume 65 (22), pages 7612-7617, 2000.

A recent revision by Duncan et al., *Advanced Drug Delivery Reviews*, Volume 57 (2005) 2215-2237, on the biocompatibility and toxicity of dendrimers, presents strategies that have been employed to date to utilize the dendritic topology on nanodevices for medical purposes and in which is shown that the strategy presented in this invention has not yet been explored. The great majority of the reports on dendrimer synthesis for various fundamental and application studies, only use chemical modification of the nucleus or of the periphery of the structure and the branching structures as support for the connection between both parts and their use for other purposes has received little attention. When the functional groups on the periphery are used, the introduction of various molecules with specific purposes, yet different from each other, such as those indicated in the references cited in this document, it is in detriment to the quantities that it becomes possible to introduce the others, since all of them utilize the terminal groups of the dendrimer. This commitment requires, in some cases, the use of dendrimers with high generations (having a great number of terminal groups) in order to have sufficient active molecules for the effect and properties desired, that in some cases are key. Therefore, the loading capacity of any given dendrimer will be limited to a maximum corresponding to the number of terminal functional groups. In FIG. 2, a dendrimer of this type is shown in diagrammatic form illustrating examples of its components for a biomedical application. The codes in FIG. 2 are given as stars, representing their load, circles represent solubilizing terminal groups, triangles represent routing terminal groups, points represent branching elements, and lines represent spacers.

It is possible to extend the strategies for building dendrimers and dendrons if one visualizes the branching structure as being made up by two or more parts, a functional structure (for example, a drug), hereinafter called load, and the structures that serve as spacers, and structures that provide the point of branching for forming the following one. This allows the inclusion of bifunctional molecules, at least, on each arm being built before coupling a molecule that serves as a branching element.

The possibility of introducing active molecules from the first generation or directly joined to the nucleus, will avoid the partial annexation that is achieved in high generations caused by being sterically hindered induced by the proximity of the surface functional groups in conventional dendrimers and dendrons, mainly with voluminous molecules; the example of spacer molecules is useful in both situations. Thus, to cite an example of this, Khandare et al, *Bioconjugate, Chemistry;* 16 (2), pages 330-337; 2005, only achieved 32% yield from the terminal groups in the conjugation of the steroid, methylprednisolone (as the load) with a fourth generation PAMAM dendrimer with 64 terminal hydroxyl groups. This is the equivalent of 20 steroid molecules. This is a situation that would be possible with a second generation dendrimer under the strategy of this invention.

In this way, this invention presents dendrimer structures with the type of characteristics that make use of the internal structure of the dendrimer being built to place additional molecules via covalent bonds between elements characteristic of amplifying a certain dendrimer.

DETAILED DESCRIPTION OF THE INVENTION

Figure 1:
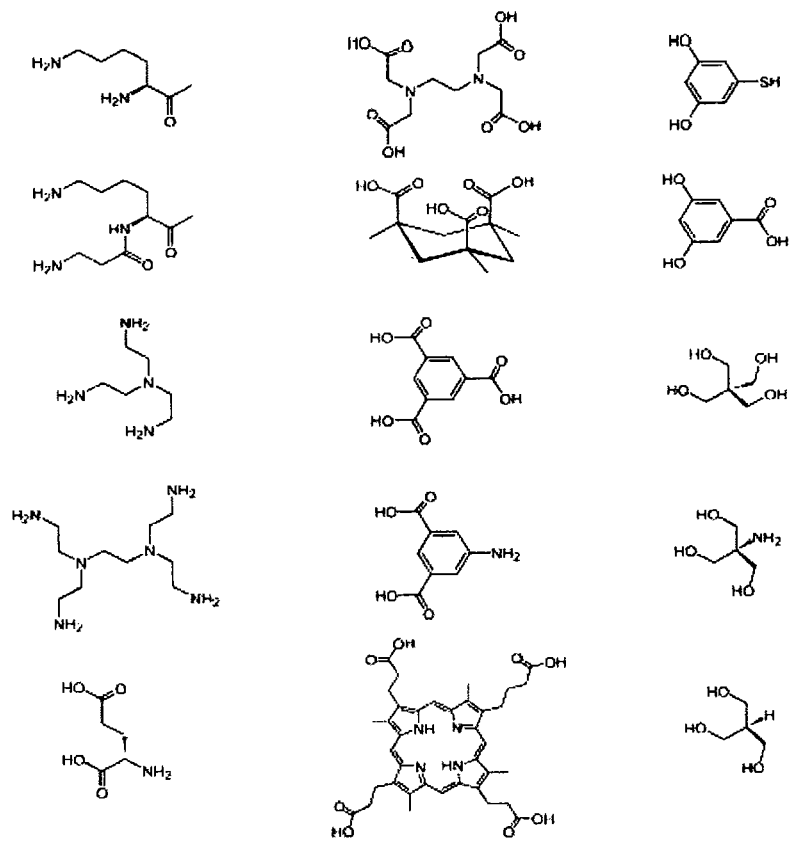
FIG. 1. Examples of the molecules commonly used in practice as nuclei in building dendrimers.
Figure 2:
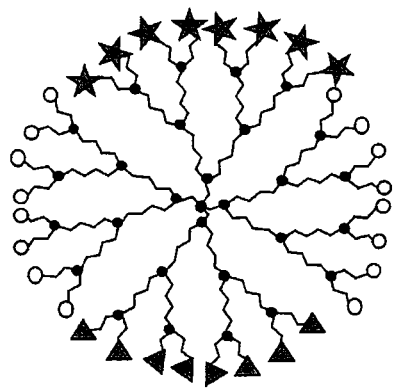
FIG. 2. Schematic illustration of the dendrimer structure with biomedical applications.
Figure 3:
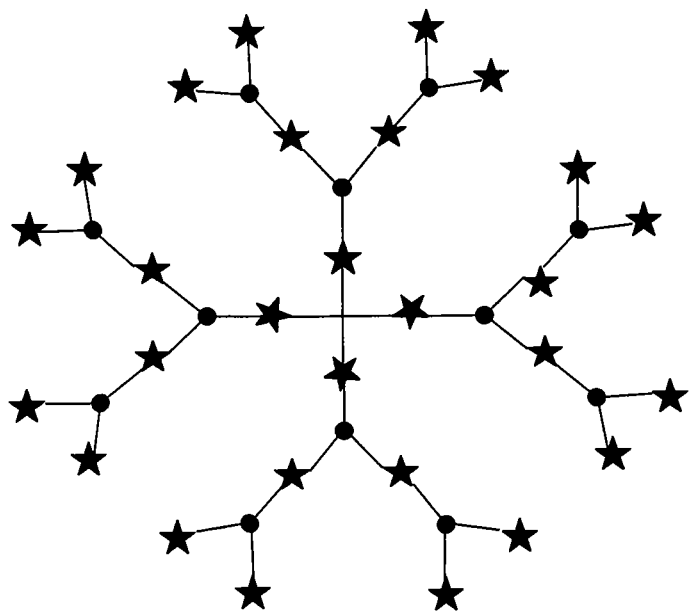
FIG. 3. Schematic representation of a Trojan horse dendrimer.

We will first describe the elements necessary for the synthesis of dendrimer structures:

Nucleus: The nucleus is an element that determines the characteristics of amplification in the construction of dendrimers and dendrons. Its functionality, together with that of the branching structure, determines the multiple of the geometric growth progression of each branch and, consequently, of the size possible to obtain before arriving at growth impossibility due to steric hinderence between the terminal groups. One essential characteristic of the nuclei, is the presence of at least two functional groups or reactive sites, that may the same or different, to initiate branching of the dendrimer or dendron and this is what is called functionality. In FIG. 1 some of the molecules are shown which are used in practice as nuclei in the construction of dendrimers.

The number of functional groups on the surface of the dendrimer, their diameter, and molecular configuration are dependent on their nucleus.

Molecules with functional groups that are sufficiently reactive are used to perform addition or substitution reactions between those that are cited herein as a non-restrictive illustration including: hydroxyl, amine, carboxy, mercapto, carbonyl, ester, halide, amide, imino, enol, silyl, anhydride, acyl, isocyanate, nitrile, vinyl, alyl, urea, isothiocyanate. Examples of nuclei useful for this invention may be cited in an illustrative and non-restricted manner; glycols, such as: ethylene glycol, propylene glycol, and the polymers of both, glycerine, trimethylolpropane, pentaerythritol, polyhydroxy phenols such as phloroglucinol, di- and trialkylamines, polyethylamines, such as ethylenediamine, diethylenetriamine, triethylenetetramine, di- and trialkyl enol amines such as dietanolamine, triethanolamine, amino carboxylic acids, such as ethylenediaminetetraacetic (EDTA), fumaric, maleic, phtalic, malic acid.

Spacer Structures, hereinafter called spacers, are molecules that are included in the dendrimers and dendron synthesis for the purpose of giving sufficient space to accommodate the active load and, optionally, create a functionality different than the opening for the active load, to couple a branching structure. These spacers are capable of modifying some characteristics of the dendrimer such as its molecular mass, half life, solubility, or its capacity to buffer the pH in the integrated or disintegrated form of the dendron or dendrimer.

The spacers have two useful chemical functionalities which may be the same or different. The first of these to join with the chemical functionalities of the nucleus, of the active load, of the branching molecule, or the molecule that forms the terminal structure and the second functionality which is to continue building the dendrimer or the dendron using a chemical reaction with a functional group lo of the active load of the branching molecule or of the molecule that will form the terminal structure.

The functional groups in the spacers are sufficiently reactive to produce addition or substitution reactions, and may be, for example, hydroxyl, mercapto, carbonyl, carboxy, amino, and ketone, or a combination of these. Some spacers preferred in the practice are, for example, 6-aminohexanol, 6-mercaptohexanol, 10-hydroxydecanoic acid, glycine, and other amino acids, 1,6-hexanediol, beta-alanine, 2-aminoethanol, 2-aminoethanethiol, 5-aminopentanoic acid, 6-aminohexanoic acid, 3-maleimidobenzoic acid Load Structure, hereinafter called load, constitutes the active part of the dendron or dendrimer and it is possible to use any molecule the physical and/or chemical properties of which you wish to use in its form integrated to the dendrimer or dendron, or free once the dendrimer or dendron is disintegrated. These structures possess at least two useful functional groups in order to be able to form an integral part of the dendrimer via covalent bonds. Some examples of loads that we may mention are: catalyst, diagnostic agents, analytic agents, and therapeutic agents.

Branching Structure, hereinafter branching elements, are molecules of the $AB_x$ type, where A and B are different functional groups and x is equal to or greater than two and it corresponds to the number of the B groups. Group A is reactive towards the terminal functional groups of the dendrimer or dendron being built, while the B groups are not and they fulfill the purpose of multiplying the terminal functional groups regularly to continue building the dendrimer or dendron, to generate the multitude of final functional groups, to serve as a reactive group to couple with at least one terminal structure. The chemical substance that groups A and B possess may have characteristics of the type that fulfill the function of a spacer at the same time. Generally speaking, the functional group combinations present in the branching elements are: hydroxy-dicarboxylic, hydroxy-tricarboxylic, dihydroxycarboxylic, trihydroxycarboxylic acids, amino-dicarboxylic, amino-tricarboxylic acids, and analogous combinations of other functional groups that are sufficiently reactive to carry out substitution or addition reactions. Specific examples of branching elements are: malic acid, 3,5-dihydroxybenzoic acid, 2,2-bis(hydroxymethyl)propanoic acid.

Terminal Structures are molecules that are desirable for incorporation into the dendrimer in order to impart their physical or chemical properties such as: biological, solubility, signaling, and/or fluorescent activity, etc. As an example of these structures the following may be mentioned:

Biological activity: drugs, antibodies, proteins, genetic material.

Solubilizing structures, such as: ionizable groups, homopolymers and copolymers of ethylene glycol, propylene glycol, to mention a few examples.

Signaling structures, such as: antibodies, proteins, folic acid, for example.

Structures known as fluorescent labels, such as: fluorescein, and its derivatives, pyrene and its derivatives, quantum points, rodamine, and its derivatives, for example.

The structure of the dendrimers and dendrons which are the object of this invention, comprise:

One nucleus, joined to at least one first generation, which includes the following sequence called First Generation:

$$eCer$$

Where:
e represents the spacer and may be present or not in any position shown regardless of its presence in another position.
C represents the load of the dendrimer or dendron and is present in at least one of the generations of the structure of the dendrimer or dendron.
r represents the branching element.

This sequence is present at least once, in the structure of the dendrimer and each time it replicates it gives rise to a new generation.

An example of the sequence with three generations is given below. This example is only illustrative and non-restrictive.

$$X(eCer(eCer(eCer)_{N_b})_{N_b})_{N_c}$$

X represents the nucleus
$N_o$ represents the multiplicity of the nucleus (1, 2, 3, and so on)
e represents the spacer and may be present or not in any position shown regardless of its presence in another position
C represents the load of the dendrimer or dendron and it is present in at least one of the positions shown
r represents the branching element.
$N_b$ represents the multiplicity of the branching element, r The generation that halts the replication of generations, we will call: Terminal Generation and it is represented by the equation:

$$X(eCer(T)_{N_b})_{N_c}$$

Where:
T represents the terminal group that may be T=C or T≠C.
An example of the sequence with three generations is given below, where the third generation is terminal. This example is only illustrative and non-restrictive.

$$X(eCer(eCer(eCer(T)_{N_b})_{N_b})_{N_b})_{N_c}$$

The dendrimers and dendrons which are the object of this invention are called "Trojan Horse Dendrimers", because the load is located inside of it.

It is possible to introduce into the dendrimer and dendron a number of active loads equal to the number of covalent bonds formed in the dendrimer or dendron, from the nucleus to the periphery and they may be calculated using Equation 1.

$$C_i = N_c \sum_{i=0}^{G} N_b^i$$

Where:
$C_i$ Represents the total number of bonds formed from the nucleus to the surface of the dendrimer.
$N_c$ Represents the multiplicity of the nucleus.
$N_b$ Represents the multiplicity of branching.
G Represents the number of the generation of the dendrimer.

The amount of the active load that may be introduced into the internal network of the dendrimer is given by equation 2.

$$Z_i = N_c \sum_{i=o}^{G-1} N_b^i$$

Where:
$Z_i$ Represents the number of covalent bonds formed until generation ($G_i$).

In Table 2, a comparison between the results of Equations 1 and 2 is presented, and the percentage of excess of useful bonds to introduce the active load, on the terminal groups, that represent the number of functional groups that in current practice are used to load the dendrimer and the dendron with active molecules.

Figure 4:
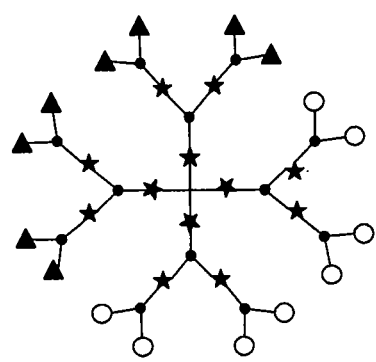
FIG. 4. Schematic representation of a multifunctional Trojan horse dendrimer with a homogeneous load.
Figure 5:
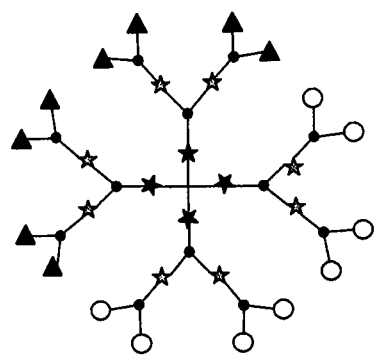
FIG. 5. Schematic representation of a multifunctional Trojan horse dendrimer with a heterogeneous load incorporated in layers.
Figure 6:
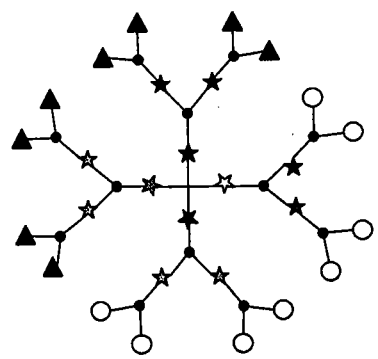
FIG. 6. Schematic representation of a multifunctional Trojan horse dendrimer with heterogeneous load incorporated in the construction of dendrons before coupling to the nucleus.

Conventional synthesis strategies for the construction of dendrimers and dendrons make it possible, potentially, to create dendrimer structures, shown in FIG. 4 with a homogeneous load; FIG. 5, with a heterogeneous load incorporated by layers and FIG. 6 with a heterogeneous load incorporated in the construction of the dendrons before coupling with the nucleus, achieving incorporation of two or more types of active load in the dendrimer in different layers and arms.

Figure 7:
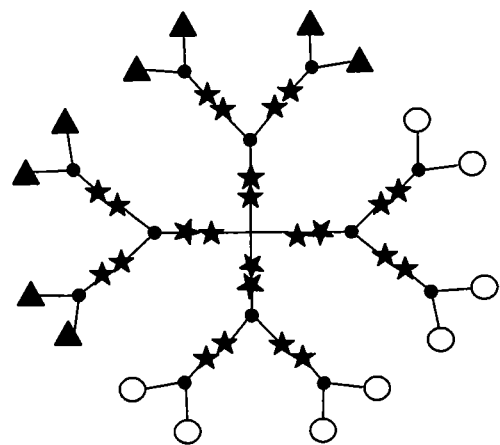
FIG. 7. Schematic representation of a multifunctional Trojan horse dendrimer doubly loaded by generation.

With the capacity of the Trojan Horse dendrimers and dendrons to incorporate a load in the arms it is possible to obtain two active loads (equal or different) in each generation of the dendrimer, thus accomplishing an increase in the active load. This may be seen in FIG. 7, which shows a doubly loaded dendrimer in each of the generations.

The dendrimers and dendrons, the reason for this invention, are degradable; and this degradability makes it possible to deliver from the load to the level necessary in the medium in which one wishes to fulfill the purpose for which the dendrimer or dendron was designed. The degradability of the dendrimers and dendrons may be biological, chemical, and/or physical. Enzymes are preferably used in the case of biological degradability; acid or alkaline hydrolysis is preferably used in chemical degradability; and in physical degradability it is preferably accomplished using a change in temperature.

Figure 8:
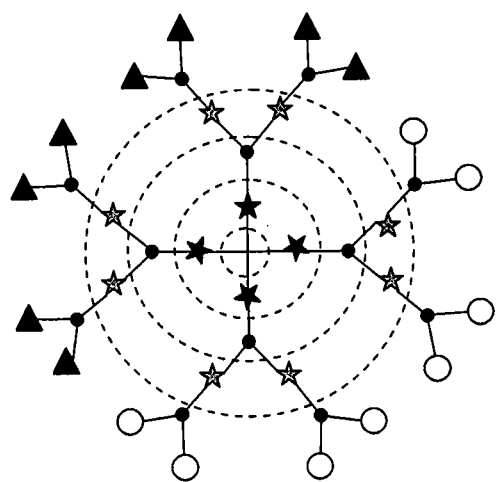
FIG. 8. Schematic representation of the degradation zones of a Trojan horse dendrimer.

The sequence of degradation is shown in FIG. 8, and may be:

From the outside to the inside, in a sequential manner, beginning with the terminal generation and continuing the degradation with intermediary generations until it arrives at the nucleus.

TABLE 2

Comparison between total bonds formed and terminal bonds in two types of dendrimers possible.

| | Nucleus $N_c$ = 3 Branching Unit, $N_b$ = 2 | | | Nucleus $N_c$ = 4 Branching Unit, $N_b$ = 2 | | |
|---|---|---|---|---|---|---|
| Generation | Number of terminal groups | Number of molecules introduced (Active Load) | Excess on the surface % | Number of terminal groups | Number of molecules introduced (Active Load). | Excess on the surface % |
| 0 | 3 (Nucleus) | 3 | 0.0 | 4 (Nucleus) | 4 | 0.0 |
| 1 | 6 | 9 | 50.0 | 8 | 12 | 50.0 |
| 2 | 12 | 21 | 75.0 | 16 | 28 | 75.0 |
| 3 | 24 | 45 | 87.5 | 32 | 60 | 87.5 |
| 4 | 48 | 93 | 93.8 | 64 | 124 | 93.8 |
| 5 | 96 | 189 | 96.9 | 128 | 252 | 96.9 |
| 6 | 192 | 381 | 98.4 | 256 | 508 | 98.4 |
| 7 | 384 | 765 | 99.2 | 512 | 1020 | 99.2 |
| 8 | 768 | 1533 | 99.6 | 1024 | 2044 | 99.6 |
| 9 | 1536 | 3069 | 99.8 | 2048 | 4092 | 99.8 |
| 10 | 3072 | 6141 | 99.9 | 4096 | 8188 | 99.9 |

If all the internal bonds are taken into account for the active load in the dendrimer, it is possible to have a load that is practically the same as that achieved with a conventional dendrimer from the fifth generation, with the difference and important benefit being that the terminal groups are still available for functions with the key terminal groups in order to achieve proper performance of the dendrimer. For example, as are the solubilizing agents, which serve as guides towards specific cellular membranes in biomedical applications and tracking groups to follow the behavior and destination of the dendrimer in such a way that this strategy represents an important advance in building nanodevices for different scientific and technological purposes.

In the direction of the nucleus to the periphery; i.e., from the initial generation bond and continuing the degradation in the intermediary generations until arriving at the terminal generation.

Randomly, permitting the rupture without following a certain pattern in the covalent bonds that give form to the dendrimer structures and the dendrons.

The importance of the sequence in which the degradability occurs is that it determines more specific applications of the dendrimer or dendron, such as controlled release over time, place, and amount of the active load.

Circles A, B, C, and D in FIG. 8 mark the levels in the dendrimer in which there must be degradation to obtain the components in the active form desired, and in the example, there are 4!=24 sequences possible for degradation, in which the middle leads to the release of a type of active ingredient (green stars, for example) and the other from another sequentially. The possibility of random degradation results from the absence of any degradation pattern.

Careful selection of the elements of construction and bonds between each of the parts of the plurality of dendrimers and dendrons which are the object of this invention, make it possible to control the form of degradation thereof and, consequently, the internal delivery of the active molecules in amount, place, and time. Therefore, the strategy is adequate for delivering the established amounts from a single type of load or mixtures thereof to reinforce certain needs in some areas currently performed using two or more devices simultaneously, such as medical treatments using higher doses or synergies between the active loads. Factors affecting the speed of degradation include:

1. Strength of the chemical bonds between the molecules used.
2. Hydrophobic quality of the dendrimer.
3. Generation and molecular weight of the dendrimer.
4. Chemical reactivity of the final dendrimer.

This invention specifically presents as an example of dendrimer preparation: polyester, polyamide, and polyester-amide. The dendrimers described in patent application WO 0226867 were used as a model. In said patent application, polyester dendrimers are prepared based on 2,2-bis(hydroxymethyl)propanoic acid (bis-MPA). A typical structure of a dendrimer with two generations, using pentaerythritol as a nucleus is shown in FIG. 9.

Figure 14:
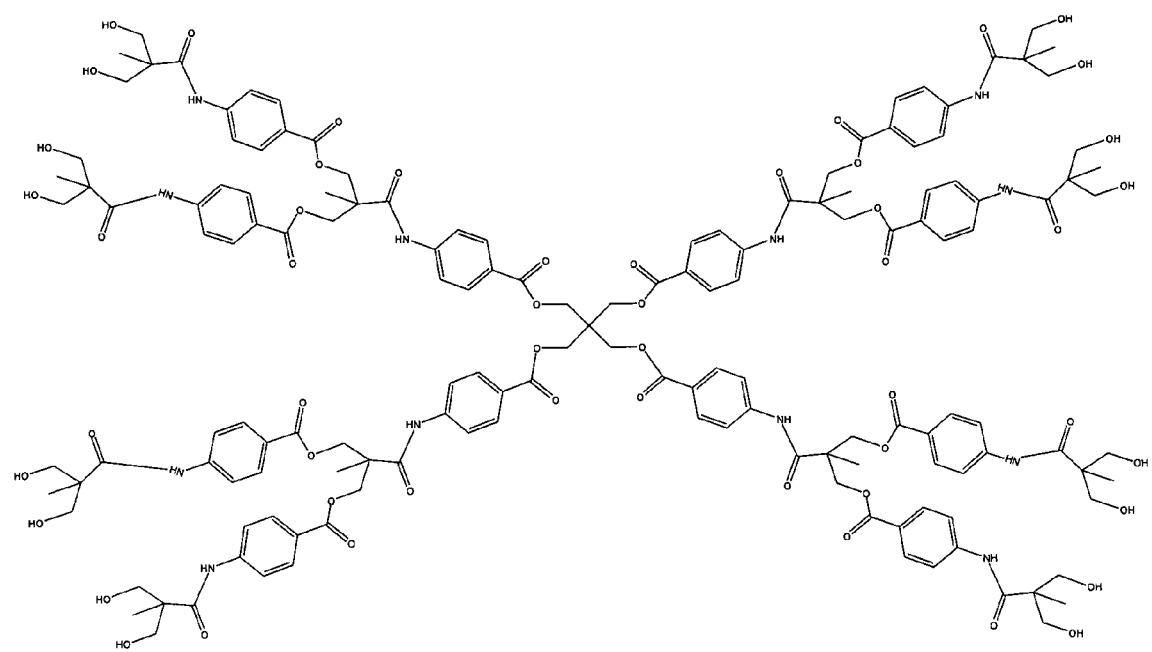
FIG. 14. Structure of a Trojan horse dendrimer with a second generation using pentaerythritol as a nucleus.

FIG. 14 is the schematic representation of a dendrimer with two polyester-amide generations, obtained by this invention; using the p-aminobenzoic acid as a load and the same elements as those mentioned in patent application WO 0226867. In this same Figure, 12 molecules of the p-aminobenzoic acid may be seen as introduced into the different branches of the dendrimer.

Figure 9:
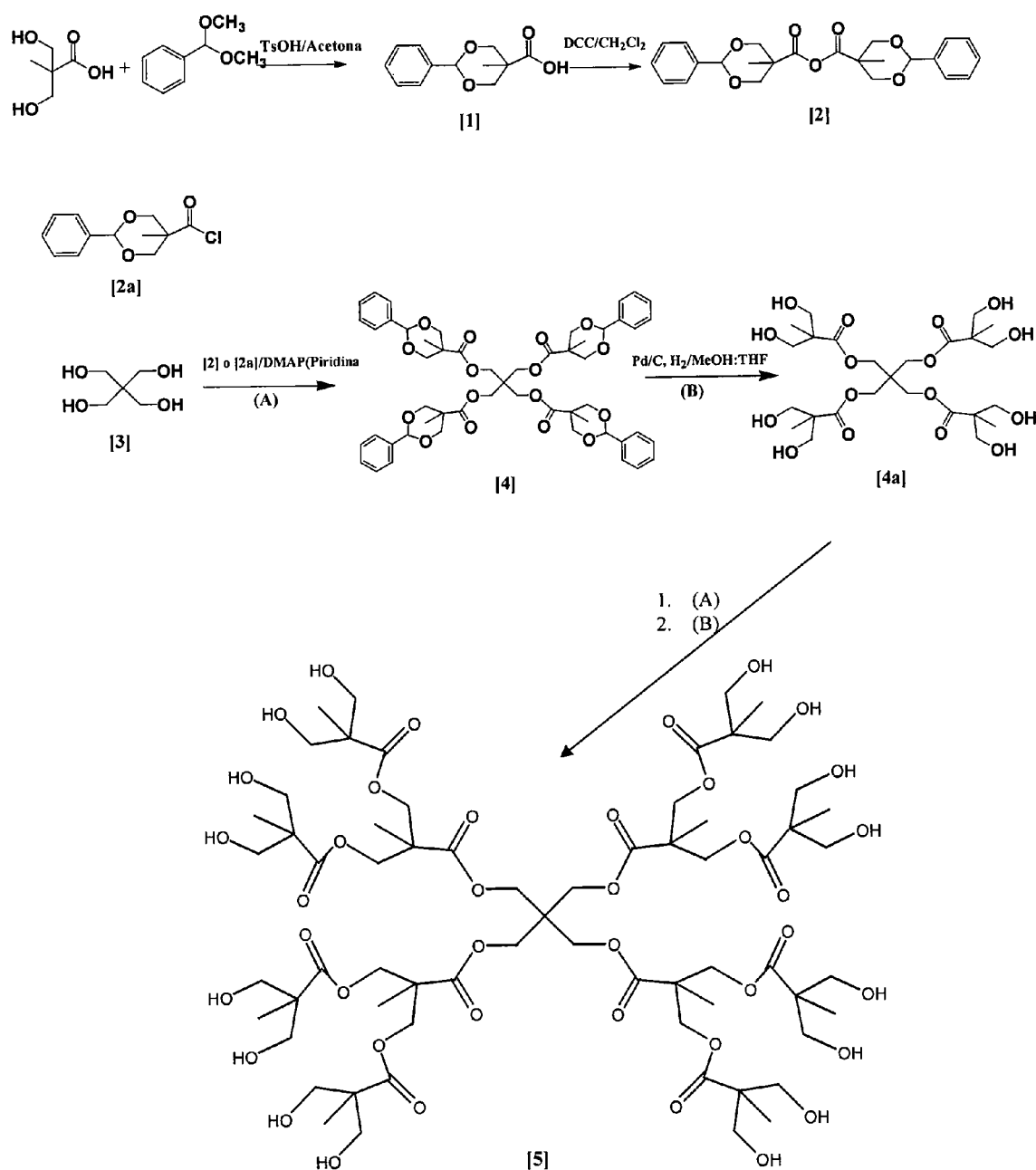
FIG. 9. Divergent synthesis and typical structure of a polyester Trojan horse dendrimer with two generations, with the pentaerythritol nucleus.

FIG. 9 shows synthesis of a polyester dendrimer with a conventional structure as an illustration of the current practice and their regular structural characteristics between the generations.

Figure 10:
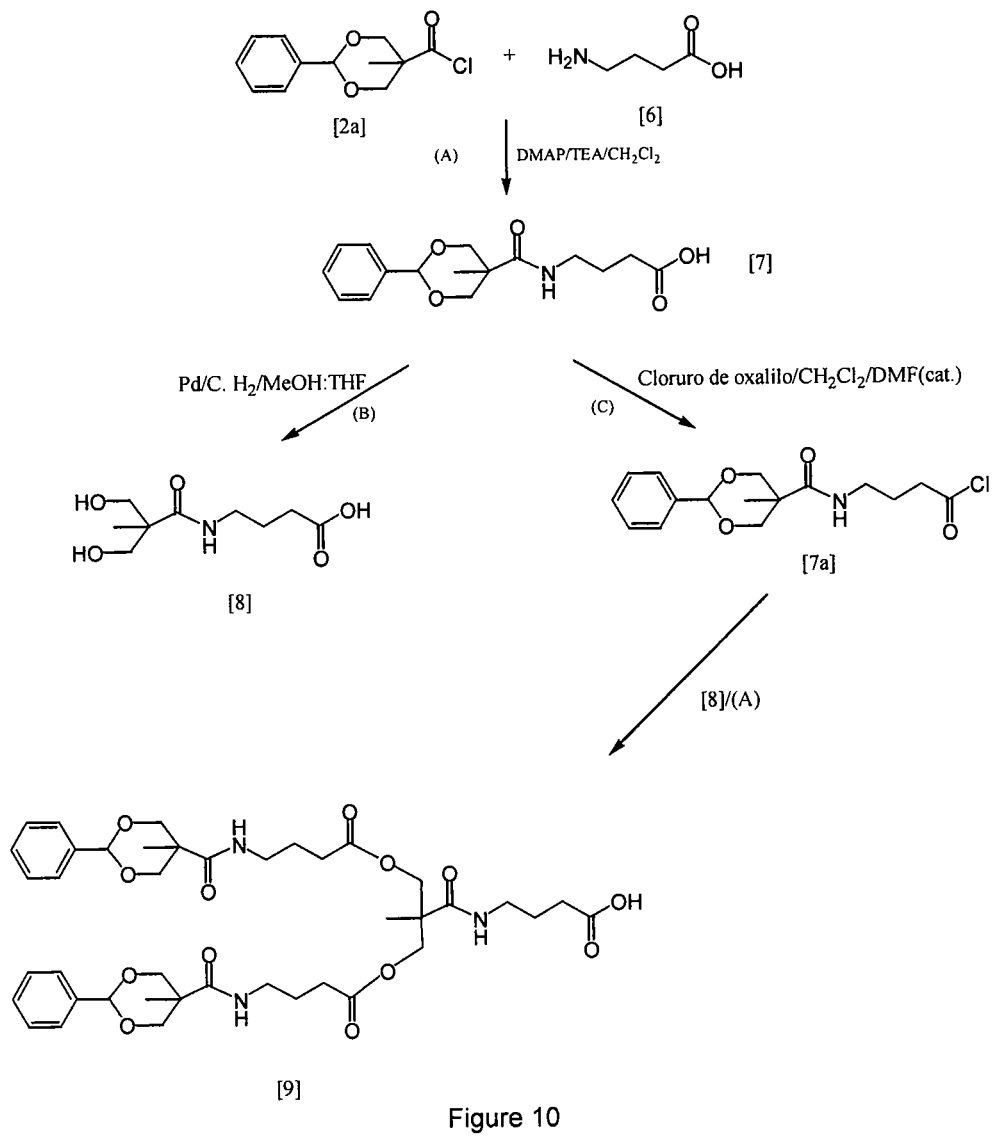
FIG. 10. Synthesis of a GABA acid Trojan horse dendron.

FIG. 10 shows an example of the reaction plan as it is performed in practice and as an example of a first generation Trojan Horse dendron with para-amino benzoic acid as a load and 2,2-bis(hydroxymethyl)propanoic acid as a branching element. This representation will be clear and understandable for a person with mid-level knowledge of the technology.

Figure 11:
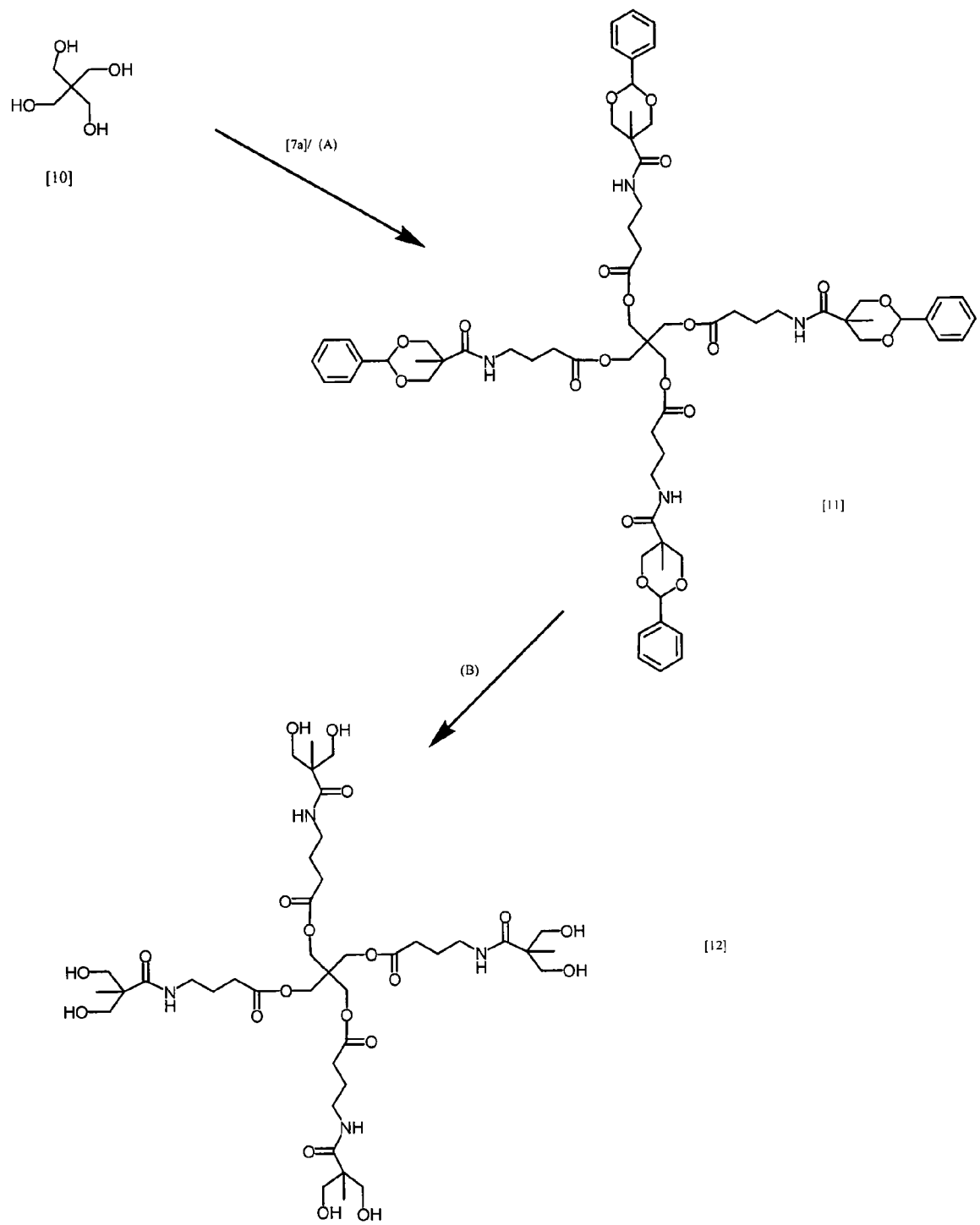
FIG. 11. Divergent synthesis of a Trojan horse dendrimer with a GABA load with a first generation.

FIG. 11 shows an example of the reaction plan and as an example and guide of how it is performed in practice, a first generation Trojan Horse dendron with gamma-aminobutyric acid as a load and 2,2-bis(hydroxymethyl)propanoic acid as a branching element. The indications of the reaction conditions correspond to those indicated in FIGS. 9 and 10 and will be clear to a person with mid-level knowledge of the material.

Figure 12:
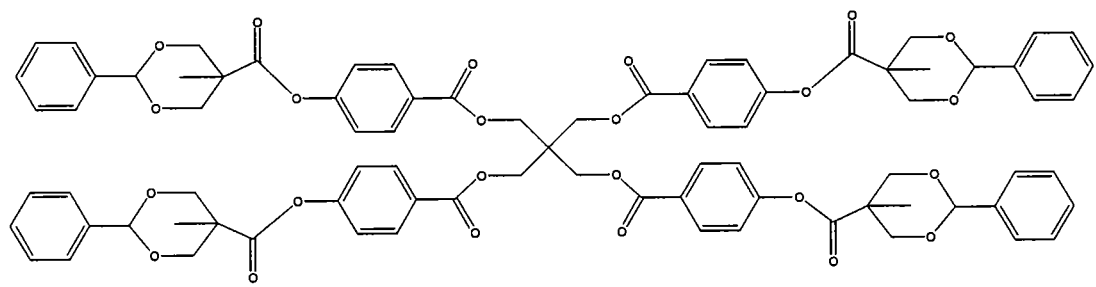
FIG. 12. Structure of a Trojan horse dendrimer having a PHBA load with a first generation.

FIG. 12 shows, as an example, a Trojan horse dendrimer with a first generation that contains para-hydroxy benzoic acid as a load and 2,2-bis(hydroxymethyl)propionic acid and a terminal group with benzylidene constructed in a similar manner as the dendrimer in the figure using the corresponding initial compounds: para-hydroxy benzoic acid, and 2,2-bis (hydroxymethyl)propionic acid and following the plan indications for reactions in FIG. 11.

Figure 13:
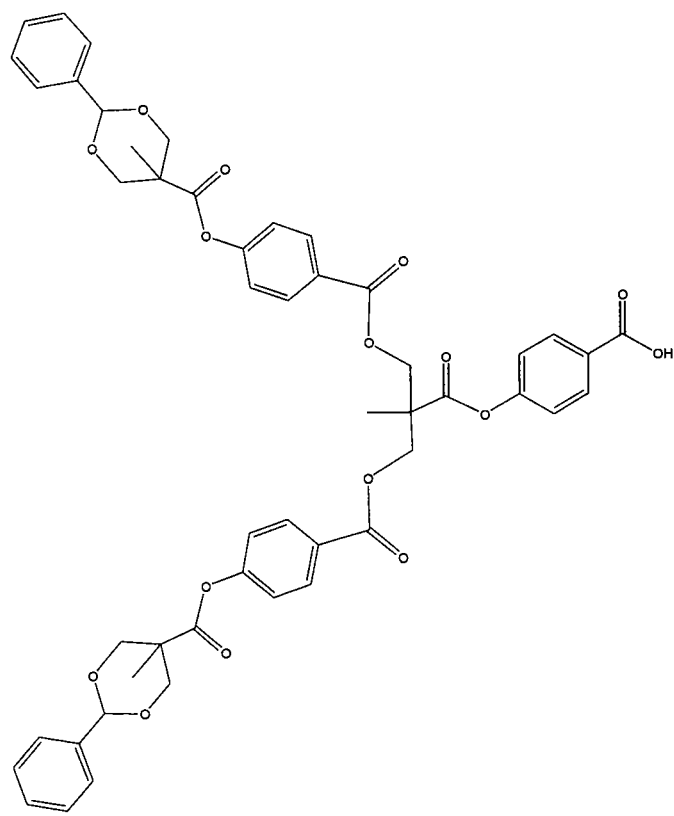
FIG. 13. Structure of a dendron with a first generation with sequence "C r."

FIG. 13 shows a Trojan Horse dendron with a second generation that contains para-hydroxy benzoic acid as a load and 2,2-bis(hydroxymethyl)propanoic acid as a branching element and with a terminal group of benzylidene and constructed following the conditions indicated in the reaction plan found in FIG. 10.

FIG. 14 shows a Trojan horse dendrimer with a second generation using pentaerythritol as a nucleus, para-amino benzoic acid as a load and 2,2-bis(hydroxymethyl)propanoic acid as an amplifier in which the 12 load structures can be seen inside the dendrimer and that may be built using the indications from the reaction plans given in FIGS. 10 and 11.

Having sufficiently described my invention, I feel that it is an innovation and therefore, claim the content of the following clauses as my exclusive property:

We claim:
1. A multifunctional dendron or dendrimer,
comprising a one or more generations covalently bonded via convergent synthesis to a reactive site on a nucleus;
wherein said nucleus has at least one reactive site in a dendron and at least two reactive sites in a dendrimer;
wherein a first generation covalently bound to said nucleus and comprises at least 2 of the following structures: a spacer, a load, a branching element;
wherein optional intermediary generations are covalently bound to said first generation or another intermediary generation, wherein said optional intermediary generations each comprises at least 2 of the following structures: a spacer, a load, a branching element; and
a terminal generation which comprises at least 3 of the following structures: a spacer, a load, a branching element, and a terminal;
wherein said first generation can be said terminal generation;
wherein said load, spacer and branching element can be the same or different in said first generation, said intermediate generation or said terminal generation;
and wherein said spacer is a molecule having a least two reactive sites, said load is a molecule having at least two reactive sites and a desired activity, and said branching element is a molecule having at least three reactive sites, and said terminal is any molecule having at least one reactive group,
and wherein there is at least one load in said multifunctional dendron or dendrimer.
2. The multifunctional dendron or dendrimer of claim 1, wherein the first generation and the terminal generation includes at least one load.
3. The multifunctional dendron or dendrimer of claim 1, wherein each of said first generation and said intermediary generations consist of a spacer, a load, a spacer and a branching element.
4. The multifunctional dendron or dendrimer of claim 1, wherein the spacers in each generation are the same.
5. The multifunctional dendron or dendrimer of claim 1, wherein the spacers in each generation are different.
6. The multifunctional dendron or dendrimer of claim 1, wherein the first generation or intermediary generations consist of a spacer, a load, and a branching element.
7. The multifunctional dendron or dendrimer of claim 1 wherein the first generation or the intermediary generations consist of a load, a spacer, and a branching element.
8. The multifunctional dendron or dendrimer of claim 1, wherein the first generation or the intermediary generations consist of a load and a branching element.
9. A dendron or dendrimer, comprising one nucleus X joined to at least one first generation, to produce a dendron or dendrimer of the formula:

$$X\bigl(eCer(T)_{N_b}\bigr)_{N_c}$$

wherein said nucleus X is a molecule having at least one reactive group in a dendron and at least two reactive groups in a dendrimer, wherein e is a spacer, and said space has at least two reactive groups, and e may be present or not in any position shown regardless of its presence in another position, wherein C is a load, wherein said load is a molecule having at least two reactive groups, wherein r is a branching element of the formula $AB_x$ type, where A and B are different reactive groups and x is equal to or greater than two;

wherein Nc is the multiplicity of first generation molecules attached to the nucleus and is at least 1 for a dendron and at least two for a dendrimer, wherein Nb is the multiplicity of the branching element and is at least 1, wherein T is a terminal group and T=C or T≠C, wherein said dendron or dendrimer is assembled by convergent synthesis, and said load is internal.

* * * * *